(12) United States Patent
Demitraszek, Sr.

(10) Patent No.: US 11,313,248 B2
(45) Date of Patent: Apr. 26, 2022

(54) 3-D LATTICE BEARING SUPPORT STRUCTURE

(71) Applicant: Raytheon Technologies Corporation, Farmington, CT (US)

(72) Inventor: Anthony Demitraszek, Sr., Coventry, CT (US)

(73) Assignee: Raytheon Technologies Corporation, Farmington, CT (US)

(*) Notice: Subject to any disclaimer, the term of this patent is extended or adjusted under 35 U.S.C. 154(b) by 0 days.

(21) Appl. No.: 16/867,363

(22) Filed: May 5, 2020

(65) Prior Publication Data

US 2021/0348522 A1 Nov. 11, 2021

(51) Int. Cl.

| | | |
|---|---|---|
| *F01D 25/16* | (2006.01) | |
| *F02C 7/06* | (2006.01) | |
| *F16M 11/00* | (2006.01) | |
| F16C 27/00 | (2006.01) | |
| F16M 13/00 | (2006.01) | |
| F16C 13/04 | (2006.01) | |

(52) U.S. Cl.
CPC .............. *F01D 25/162* (2013.01); *F02C 7/06* (2013.01); *F16M 11/00* (2013.01); *F05D 2220/32* (2013.01); *F05D 2240/50* (2013.01); *F16C 13/04* (2013.01); *F16C 27/00* (2013.01); *F16C 2300/32* (2013.01); *F16C 2360/23* (2013.01); *F16M 13/00* (2013.01); *F16M 2200/00* (2013.01)

(58) Field of Classification Search
CPC ...... F01D 25/162; F02C 7/06; F05D 2220/32; F05D 2240/50; F16C 2360/23; F16C 17/02; F16C 17/12; F16C 17/20; F16C 33/02

USPC .......................................................... 415/213.1
See application file for complete search history.

(56) References Cited

U.S. PATENT DOCUMENTS

| | | | |
|---|---|---|---|
| 10,550,726 B2 | 2/2020 | Moniz et al. | |
| 2017/0362958 A1* | 12/2017 | Von Berg .............. | F01D 25/164 |
| 2019/0338675 A1 | 11/2019 | Schmidt | |
| 2020/0025254 A1 | 1/2020 | Ganiger et al. | |
| 2020/0096041 A1* | 3/2020 | Wojtyczka .............. | F01D 25/04 |
| 2020/0340488 A1* | 10/2020 | Kobielski ............. | F04D 29/056 |
| 2021/0180650 A1* | 6/2021 | McDade ................ | F16C 23/045 |

FOREIGN PATENT DOCUMENTS

| | | |
|---|---|---|
| EP | 3464832 B1 | 4/2020 |
| WO | 2019180365 A1 | 9/2019 |
| WO | 2019180375 A1 | 9/2019 |

OTHER PUBLICATIONS

Extended European Search Report for EP Application No. 21172046.1, dated Nov. 2, 2021, 7 pages.

* cited by examiner

*Primary Examiner* — Yi-Kai Wang

(74) *Attorney, Agent, or Firm* — Kinney & Lange, P.A.

(57) ABSTRACT

A lattice bearing support includes a circular inner structure having a center axis and an inner radial surface, an inner rim projecting axially inward from the circular inner structure toward the center axis, a circular outer structure located outward of the circular inner structure with respect to the center axis and having an outer radial surface, an outer radial flange on the circular outer structure that projects radially outward from the outer radial surface, and a number of struts extending radially between the circular inner structure and the circular outer structure.

18 Claims, 9 Drawing Sheets

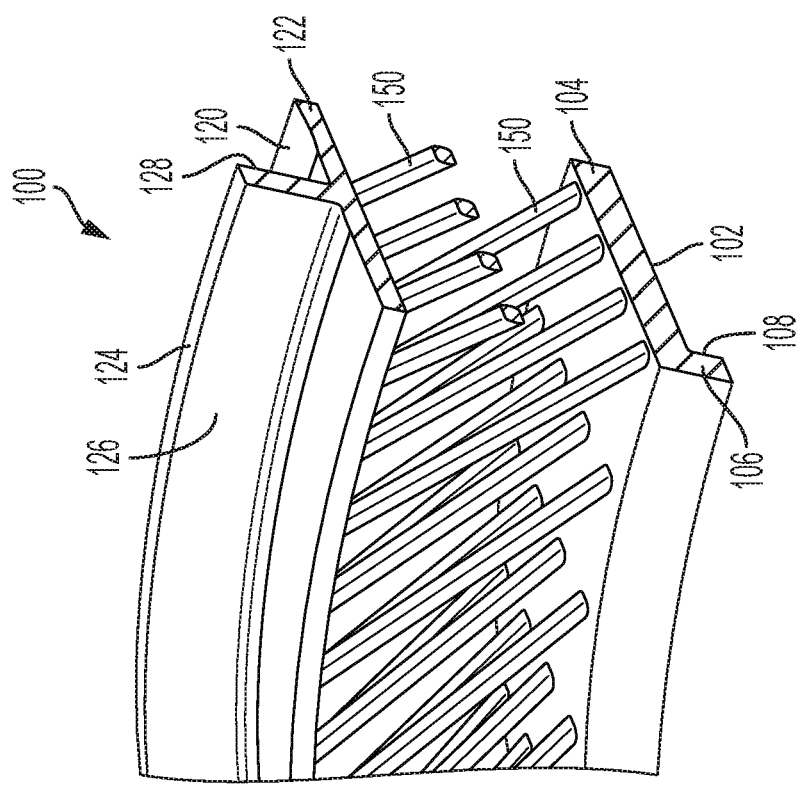
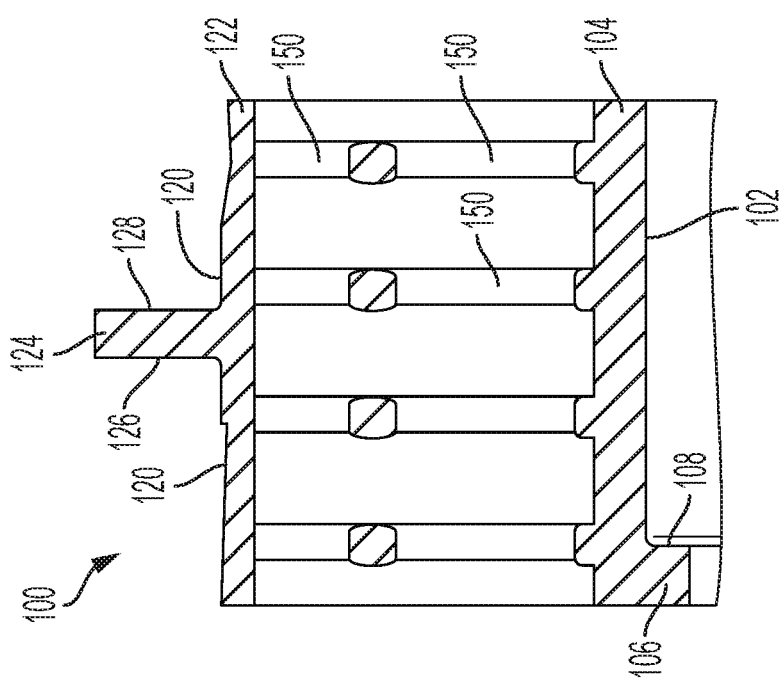
FIG. 3B
FIG. 3A

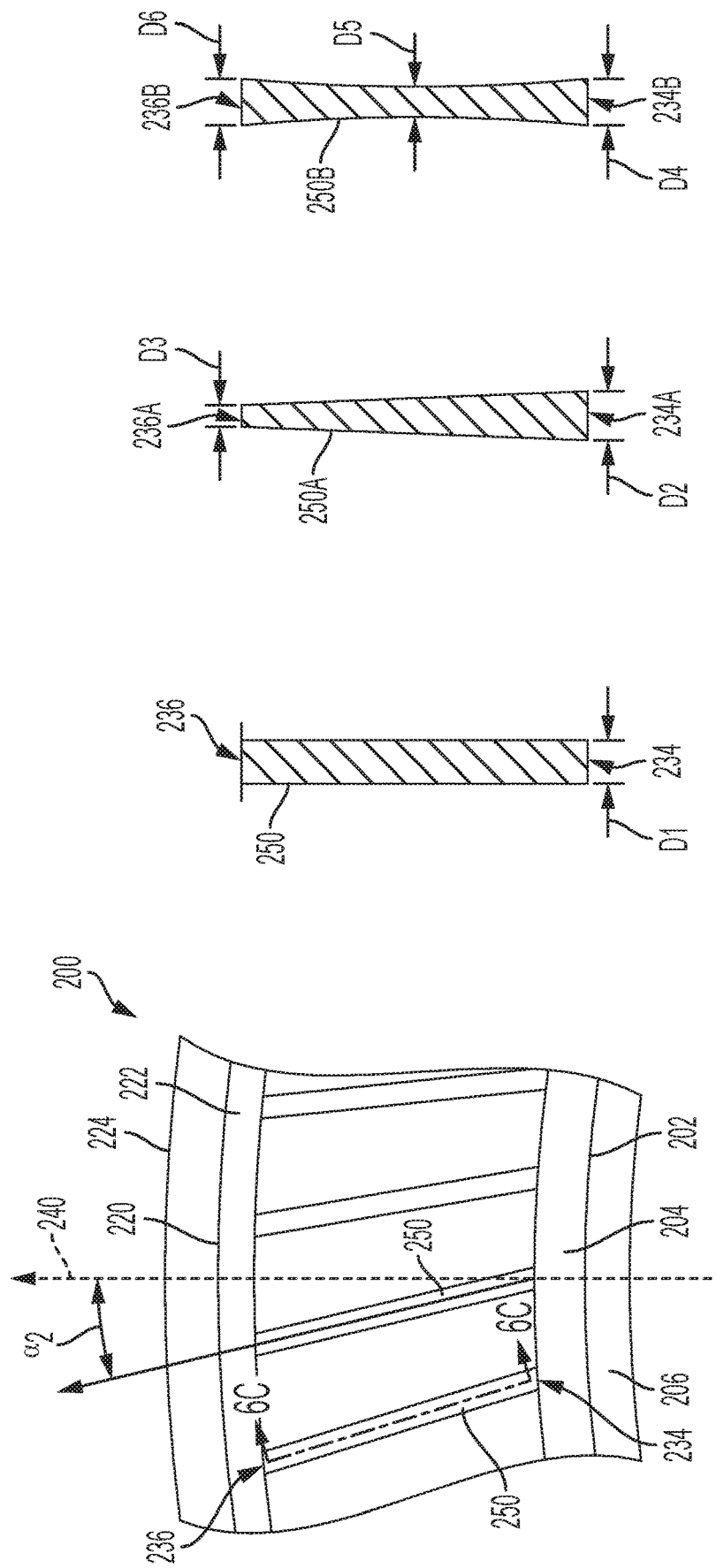

US 11,313,248 B2

3-D LATTICE BEARING SUPPORT STRUCTURE

BACKGROUND

The present disclosure relates generally to gas turbine engines, and more particularly, to a three-dimensional lattice structure for supporting a bearing assembly in a gas turbine engine.

A gas turbine engine typically includes a high pressure spool, a combustion system and a low pressure spool disposed within an engine case to form a generally axial, serial flow path about the engine centerline. The high pressure spool includes a high pressure turbine, a high pressure shaft extending axially forward from the high pressure turbine, and a high pressure compressor connected to a forward end of the high pressure shaft. The low pressure spool includes a low pressure turbine, which is disposed downstream of the high pressure turbine, a low pressure shaft, which typically extends coaxially through the high pressure shaft, and a low pressure compressor connected to a forward end of the low pressure shaft, forward of the high pressure compressor. The combustion system is disposed between the high pressure compressor and the high pressure turbine and receives compressed air from the compressors and fuel provided by a fuel injection system. A combustion process is carried out within the combustion system to produce high energy gases to produce thrust and turn the high and low pressure turbines, which drive the compressors to sustain the combustion process.

Gas turbine engines used in certain applications, such as helicopters and industrial power generation, include a third spool that is a power spool. The power spool includes a power turbine, which is disposed downstream of the low pressure turbine, and a power shaft, which typically extends forward coaxially through the high and low pressure shafts. The power shaft provides torque that can turn, for example, a rotor or a generator. The high and low pressure spools as well as the power spool include alternating cascades of stators and rotors in order to work on the primary fluid in the flow path. Bearings are necessary to permit relative motion between the rotor and the surrounding stationary components. Bearing support structures are used to support a bearing in position while accommodating lateral motion that can result from static and dynamic misalignment, thermal expansion, and so on. Bearing support structures can also accommodate vibration, and can also be designed to dampen vibration. Known bearing support structures have a relatively fixed stiffness that provides a limited ability to tune the bearing support structure for a particular application. Known bearing support structures add mass to a gas turbine engine, which is disadvantageous from a perspective of fuel efficiency. Known bearing support structures can also obstruct (i.e., impede) the flow of lubricating oil within the bearing compartment and/or the flow of lubricating oil leaving the bearing compartment (e.g., scavenge oil), which can result in a higher operational temperature and/or reduced operating efficiency. Accordingly, there is a need for a bearing support structure that can be customized to provide a stiffness that is desired for a particular application, while reducing both mass and the restriction to the flow of lubricating oil.

SUMMARY

A lattice bearing support includes a circular inner structure having a center axis and an inner radial surface, an inner rim projecting axially inward from the circular inner structure toward the center axis, a circular outer structure located outward of the circular inner structure with respect to the center axis and having an outer radial surface, an outer radial flange on the circular outer structure that projects radially outward from the outer radial surface, and a number of struts extending radially between the circular inner structure and the circular outer structure.

A lattice bearing support can also include a circular inner structure having a center axis and an inner radial surface that is configured to engage an outer race of a bearing assembly, an inner rim projecting axially inward from the circular inner structure toward the center axis and having an axial face that is configured to engage with the outer race to at least partially axially support the lattice bearing support, a circular outer structure located outward of the circular inner structure with respect to the center axis and having an outer radial surface, an outer radial flange on the circular outer structure that projects radially outward from the outer radial surface while having a flange forward face and a flange aft face, and a number of struts extending radially between the circular inner structure and the circular outer structure.

BRIEF DESCRIPTION OF THE DRAWINGS

FIG. 3A is a radial cross-sectional view of the lattice bearing support shown in FIG. 2.

FIG. 3B is a perspective cross-sectional view of the lattice bearing support shown in FIG. 2.

FIG. 6B is an enlarged view of the lattice bearing support shown in FIG. 6A.

FIG. 6C is a cross-sectional view of a strut shown in FIG. 6B taken along cut-line 6C-6C.

FIG. 6D is a cross-sectional view of a second embodiment of a strut shown in FIG. 6B.

FIG. 6E is a cross-sectional view of a third embodiment of a strut shown in FIG. 6B.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may

DETAILED DESCRIPTION

The present disclosure provides a three-dimensional (3-D) lattice bearing support that can be used to support a bearing assembly. A 3-D lattice bearing support can also be referred to as a lattice bearing support. An exemplary embodiment of the lattice bearing support of the present disclosure is in a gas turbine engine, as will be shown and described below.

Figure 1:
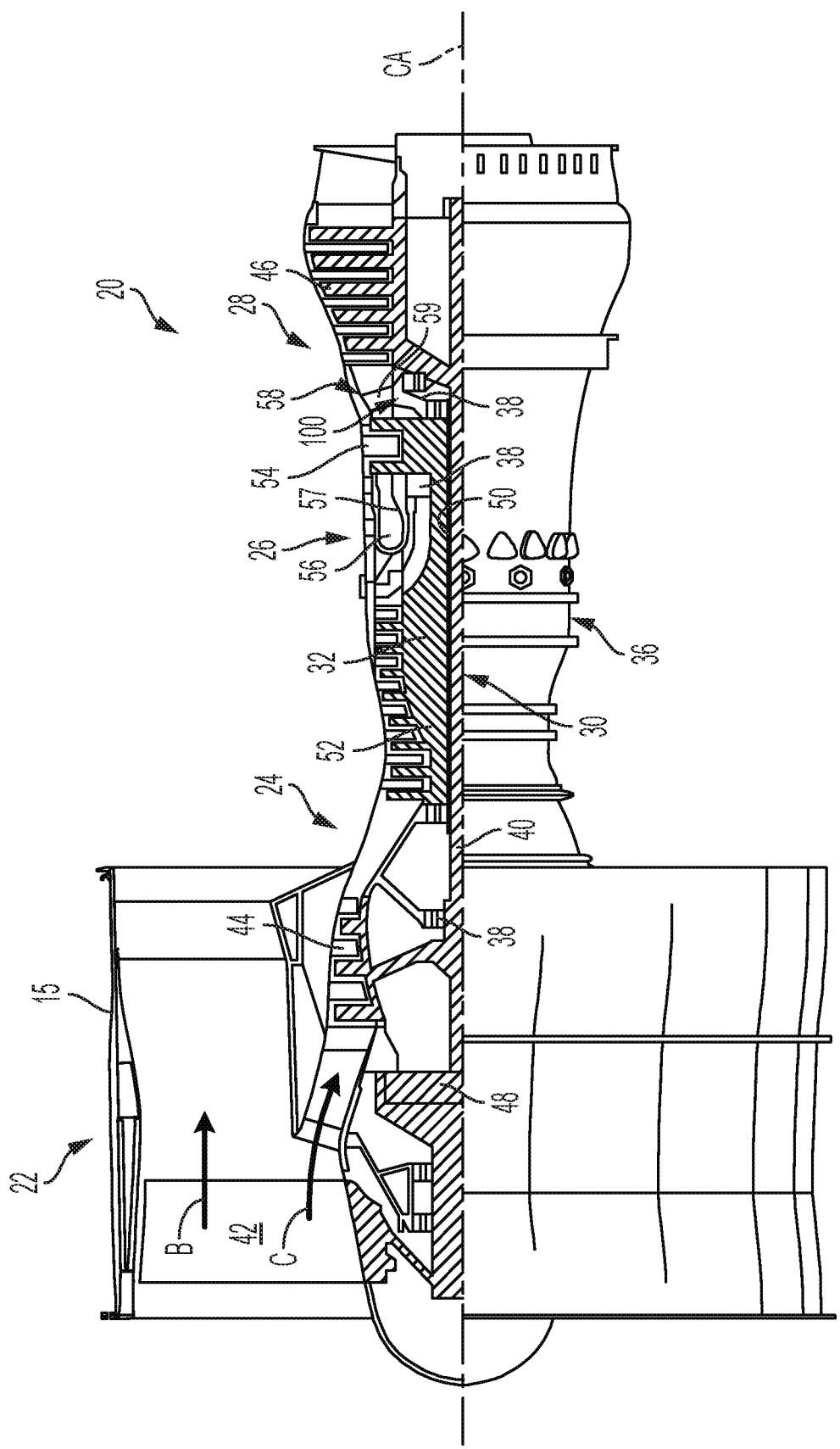
FIG. 1 is a partial cross-sectional view of a gas turbine engine.

FIG. 1 is a quarter-sectional view that schematically illustrates example gas turbine engine 20 that includes fan section 22, compressor section 24, combustor section 26 and turbine section 28. Fan section 22 drives air along bypass flow path B in bypass duct D while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24. Although the disclosed non-limiting embodiment depicts a turbofan gas turbine engine, it should be understood that the concepts described herein are not limited to use with turbofans as the teachings may be applied to other types of turbine engines including three-spool architectures.

The example gas turbine engine 20 generally includes low speed spool 30 and high speed spool 32 mounted for rotation about center axis CA of gas turbine engine 20 relative to engine static structure 36 via several bearing assemblies 38. It should be understood that various bearing assemblies 38 at various locations may alternatively or additionally be provided.

Low speed spool 30 generally includes inner shaft 40 that connects fan 42 and low pressure (or first) compressor 44 to low pressure (or first) turbine 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor 52 and high pressure (or second) turbine 54. Inner shaft 40 and outer shaft 50 are concentric and rotate via bearing assemblies 38 about center axis CA.

Combustor 56 is arranged between high pressure compressor 52 and high pressure turbine 54. Diffuser case 57 of engine static structure 36 can be arranged generally between high pressure turbine 54 and low pressure turbine 46. Diffuser case 57 further supports bearing assemblies 38 in turbine section 28 as well as setting airflow entering the low pressure turbine 46. One or more bearing assemblies 38 can be supported by lattice bearing support 100. Diffuser case 57 includes airfoils 59 which are in core flow path C. The air in core flow path C is compressed first by low pressure compressor 44 and then by high pressure compressor 52. Next, the air is mixed with fuel and ignited in combustor 56 to produce high speed exhaust gases that are then expanded through high pressure turbine 54, mid-turbine frame 58, and low pressure turbine 46. An exemplary bearing assembly 38 is supported by lattice bearing support 100 within diffuser case 57, as will be shown and discussed below with reference to FIG. 2. Other bearing assemblies 38 within gas turbine engine 20 can also be supported by a respective lattice bearing support 100.

Figure 2:
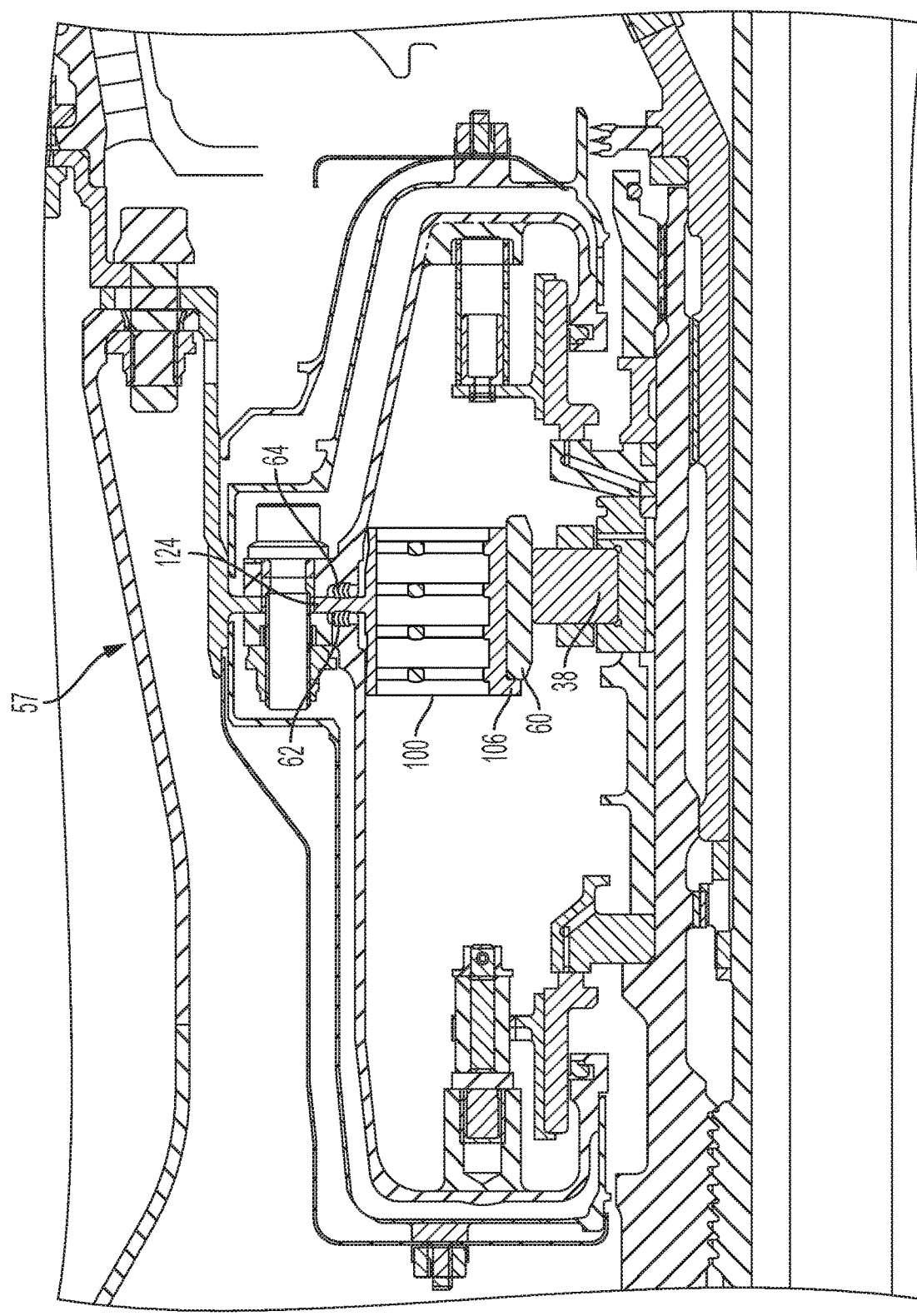
FIG. 2 is a partial cross-sectional view of the mid-turbine frame shown in FIG. 1, showing a lattice bearing support.

FIG. 2 is a partial cross-sectional view of diffuser case 57 shown in FIG. 1, showing lattice bearing support 100. Shown in FIG. 2 are bearing assembly 38, diffuser case 57, outer race 60, forward chevron seal 62, aft chevron seal 64, lattice bearing support 100, inner rim 106, and outer radial flange 124. The descriptions of bearing assembly 38 and mid-turbine frame 57 are as provided above in regard to FIG. 1. Forward and aft chevron seals 62, 64 provide axial support for lattice bearing support 100, as will be described more in FIGS. 3A-3B. Forward and aft chevron seals 62, 64 can also help contain oil within the bearing compartment (not labeled) by contacting (i.e., contactingly engaging) with outer radial flange 124. A chevron seal can also be referred to as a "C-seal". Lattice bearing support 100 can provide radial and/or axial stiffness and axial support for outer race 60, while also accommodating radial motion of bearing assembly 38. By providing radial and axial stiffness, lattice bearing support 100 can help dampen radial and/or axial vibration while allowing the passage (i.e., flow) of fluid therethrough. Oil is an exemplary fluid that can pass through lattice bearing support 100. In some embodiments, forward and aft chevron seals 62, 64 can be replaced by other structures. Accordingly, in these embodiments forward and aft chevron seals 62, 64 can be referred to as forward and aft support structures, respectively.

Figure 4:
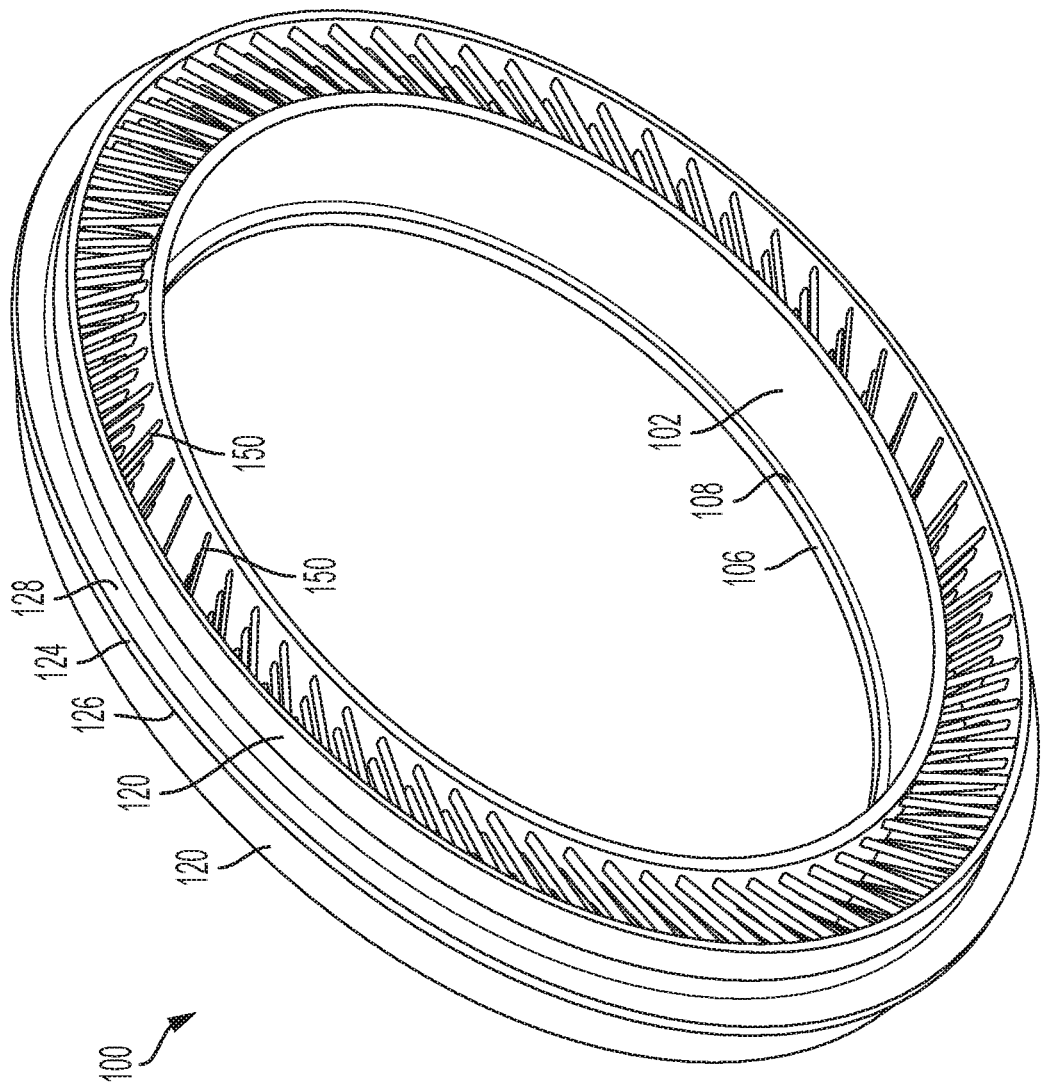
FIG. 4 is a perspective view of the lattice bearing support shown in FIG. 2.

FIG. 3A is a radial cross-sectional view of lattice bearing support 100 shown in FIG. 2. FIG. 3B is a perspective cross-sectional view of lattice bearing support 100 shown in FIG. 2. FIG. 4 is a perspective view of lattice bearing support 100 shown in FIG. 2. FIGS. 3A-3B and 4 will be described concurrently. Shown in FIGS. 3A-3B and 4 are lattice bearing support 100, inner radial surface 102, inner structure 104, inner rim 106, axial face 108, outer radial surface 120, outer structure 122, outer radial flange 124, flange forward face 126, flange aft face 128, and struts 150. Lattice bearing support 100 includes inner structure 104 and outer structure 122, held together (i.e., supported) by a number of struts 150. Inner structure 104 can also be referred to as an inner hub, and outer structure 122 can also be referred to as an outer hub. Struts 150 can also be referred to as radial struts, as beams, or as spokes. In the illustrated embodiment, there are four axial courses (i.e., rows) of struts 150. In some embodiments, there can be fewer than four axial courses of struts 150. In other embodiments, there can be more than four axial courses of struts 150. In an embodiment, the number of axial courses can range from 1-12. In some embodiments, there can be more than 12 axial courses. In a particular embodiment, the number of axial courses of struts 150 can be determined by a number of factors, with non-limiting examples including the physical size of lattice bearing support 100, the physical size of struts 150, and the desired stiffness of lattice bearing support 100. In an embodiment, various characteristics of struts 150 can be modified by design optimizations to achieve desired design parameters. Non-limiting examples of design parameters include radial and axial stiffness, mechanical stress fields, and thermals stress fields. Non-limiting examples of strut characteristics include the length, girth, shape, orientation, the number of struts 150, and the material of composition. In an exemplary embodiment, lattice bearing support 100 can be formed by an additive or hybrid-additive manufacturing process, which can facilitate the manufacturing of a particular design and making of changes to a particular design.

Referring again to FIGS. 3A-3B and 4, inner radial surface 102 makes contact with outer race 60 (shown in FIG. 2). Inner structure 104 is circular in shape and includes inner rim 106 having axial face 108 that engages with (i.e., contactingly engages) outer race 60. This helps position and align outer race 60 relative to lattice bearing support 100 during the assembly of gas turbine engine 20, while also holding outer race 60 in position relative to lattice bearing support 100 during the operation of gas turbine engine 20. Inner rim 106 is circular in shape. Inner radial surface 102 and axial face 108 can also be referred to as an outer race interface. Outer structure 122 is circular in shape and includes outer radial surface 120. Outer radial flange 124 projects outward from outer structure 122. In the illustrated embodiment, outer radial flange 124 is circular in shape and includes flange forward face 126 and flange aft face 128. Flange forward face 126 makes contact with (i.e., contactingly engages) forward chevron seal 62, and flange aft face 128 makes contact with aft chevron seal 64 (shown in FIG. 2). In other embodiments, outer radial flange 124 can have features that are different than shown in the illustrated embodiment. In an exemplary other embodiment, outer radial flange 124 can have a more complex design that includes a different interface that contactingly engages with one or more components of gas turbine engine 20. Struts 150 will be described in more detail in FIGS. 5A-5D, 6A-6F, and 7.

As noted above, lattice bearing support 100 can be formed by an additive or hybrid-additive manufacturing process. In an exemplary embodiment, powder bed fusion can be used as an additive manufacturing process to fabricate lattice bearing support 100 from metallic materials. Non-limiting examples of metallic materials that can be used include nickel, aluminum, titanium, copper, iron, cobalt, and all alloys that include these various metals. In some embodiments, various alloys of INCONEL™ can be used to fabricate lattice bearing support 100, with Inconel 625 and Inconel 718 being two exemplary alloy formulations. In other embodiments, HAYNES™ 282 can be used in fabricating lattice bearing support 100. In yet other embodiments, alloys of aluminum can be used in fabricating lattice bearing support 100. For example, an alloy of aluminum known as A205 can be used in fabricating lattice bearing support 100. All materials that include metals, metal oxides, and alloys thereof in fabricating lattice bearing support 100 are within the scope of the present disclosure. In some embodiments, lattice bearing support 100 can be manufactured by additive manufacturing, hybrid additive manufacturing, hybrid additive subtractive manufacturing, subtractive manufacturing, forging, extrusion, and/or casting, for example. In an exemplary embodiment, inner structure 104 and outer structure 122 can be manufactured separately, then later joined by struts 150 using a metallurgical joining process. Welding is an exemplary metallurgical joining process. An advantage of lattice bearing support 100 formed by additive or partial-additive manufacturing is the ability to customize lattice bearing support 100 for a particular application and/or operating condition. Non-limiting examples of a particular application include the size of lattice bearing support 100, the location of lattice bearing support 100 within gas turbine engine 20, and the type of aircraft on which gas turbine engine 20 is located (e.g., passenger jet, high-performance military aircraft.)

Figure 5A:
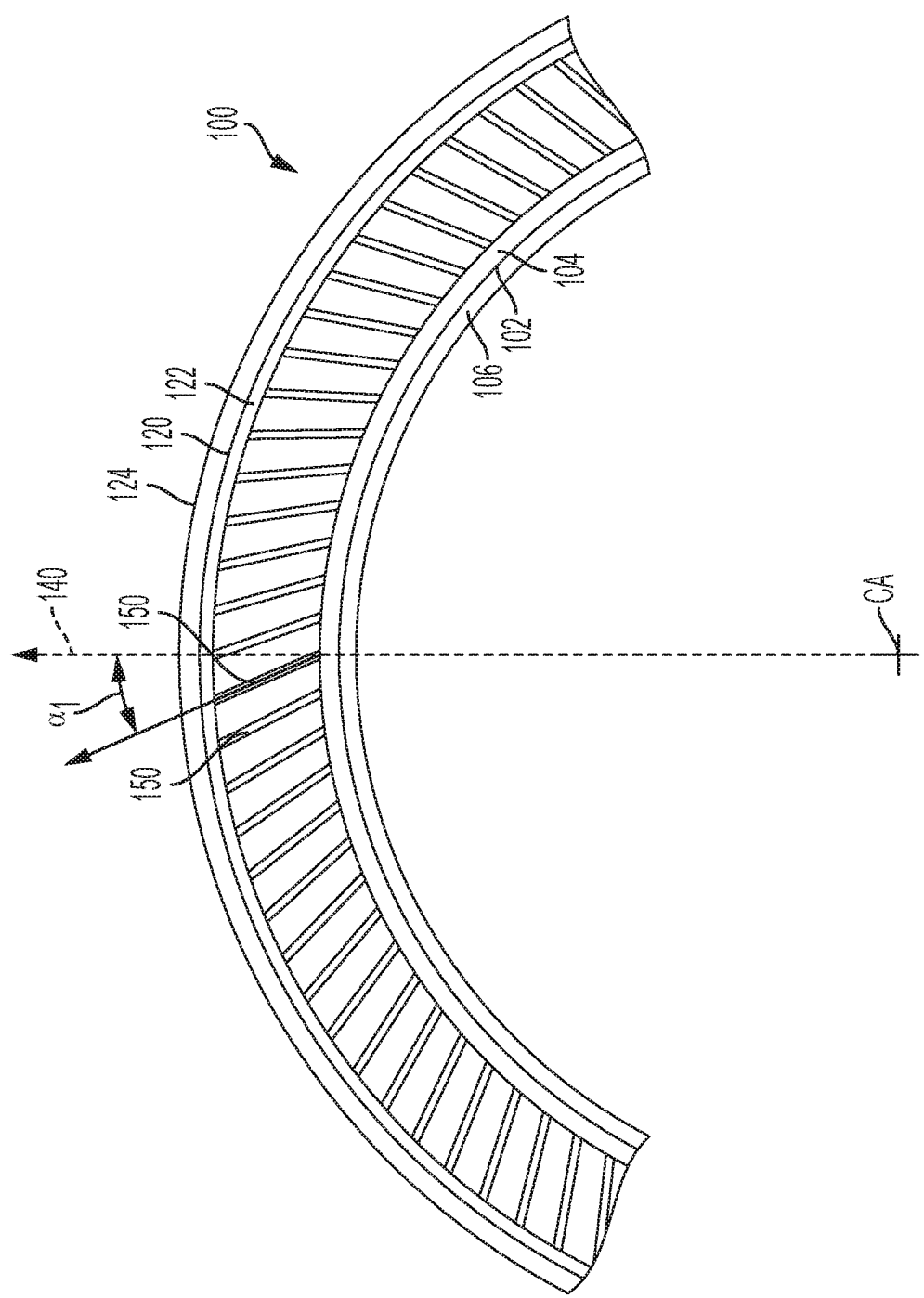
FIG. 5A is a partial axial view of the lattice bearing support shown in FIG. 4 from the perspective of line 5A-5A.
Figure 5C:
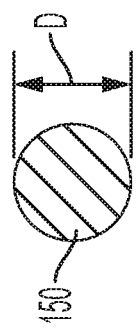
FIG. 5C is an axial cross-sectional view of a strut shown in FIG. 5B taken along cut-line 5B-5B.

FIG. 5A is a partial axial view of lattice bearing support 100 shown in FIG. 4 from the perspective of line 5A-5A. FIG. 5B is an enlarged view of lattice bearing support 100 shown in FIG. 5A. FIG. 5C is an axial cross-sectional view of strut 150 shown in FIG. 5B taken along cut-line 5B-5B. FIGS. 5A-5C will be described concurrently. Shown in FIGS. 5A-5B are lattice bearing support 100, inner radial surface 102, inner structure 104, inner rim 106, axial face 108, outer radial surface 120, outer structure 122, and outer radial flange 124, each having a description substantially similar to that provided above in regard to FIGS. 3A-3B and 4. Center axis CA is labeled in FIG. 5A (i.e., an axial view of lattice bearing support 100). Also shown in FIG. 5B are inner end 134 (i.e., directed toward inner structure 194) and outer end 136 (i.e., directed toward outer structure 122). Radial vector 140 and strut angle $\alpha_1$ are also shown in FIGS. 5A-5B. Diameter D is labeled in FIG. 5C. Radial vector 140 projects from center axis CA radially outward at any point along outer radial surface 120. Strut angle $\alpha_1$ is measured between a particular strut 150 and radial vector 140. In the illustrated embodiment, strut angle $\alpha_1$ is about 25 degrees. The measure of strut angle $\alpha_1$ as labeled in FIGS. 5A-5B is so that strut angle $\alpha_1$ is a positive value. In the embodiment illustrated in FIGS. 5A-5B, struts 150 lean to the left (i.e., in an anti-clockwise direction). In other embodiments, struts 150 can lean to the right (i.e., in a clockwise direction). In these other embodiments, strut angle $\alpha_1$ can be measured to similarly be a positive value. In yet other embodiments, struts 150 can lean in both directions (i.e., to the left and to the right). It is to be appreciated that the directions of left and right are arbitrary, being with respect to a particular view perspective.

In some embodiments, strut angle $\alpha_1$ can be less than 25 degrees. In an exemplary embodiment, strut angle $\alpha_1$ can be as small as about 0 degrees. An exemplary strut angle $\alpha_1$ that is less than 25 degrees will be shown and discussed later, in FIGS. 6A-6B. In other embodiments, strut angle $\alpha_1$ can be greater than 25 degrees. In some of these embodiments, strut angle $\alpha_1$ can be about 60 degrees. Accordingly, all values of strut angle $\alpha_1$ from about 0-60 degrees are within the scope of the present disclosure. In other embodiments, strut angle $\alpha_1$ can range from about 10-45 degrees. Strut angle $\alpha_1$ helps determine the stiffness (i.e., spring stiffness) of lattice bearing support 100. Generally speaking, a smaller value of strut angle $\alpha_1$ will provide greater stiffness (i.e., less flexibility) than a larger value of strut angle $\alpha_1$ with other strut parameters (i.e., size and material of construction) being the same. Accordingly, in a particular embodiment, strut angle $\alpha_1$ can be established to help provide the desired mechanical properties of lattice bearing support 100. In some embodiments, strut angle $\alpha_1$ can be greater than 60 degrees.

Referring again to FIGS. 5A-5B, the void area (not labeled) between radially adjacent struts 150 provides an area for the flow of fluid axially therethrough. In various embodiments, gas and/or liquid can flow axially through lattice bearing support 100. Air is an exemplary gas, and oil (e.g., lubricating oil) is an exemplary liquid. In some embodiments, scavenge oil passes axially through lattice bearing support 100, where it can be collected by a scavenge oil system (not shown). Lattice bearing support 100 can provide a greater area for axial flow as compared to a known bearing support. This can allow greater heat transfer to help cool inner structure 104 and/or outer structure 112. Moreover, the overall mass (i.e., weight) of lattice bearing support 100 can be less than that of a known bearing support. This can be beneficial in reducing the mass of gas turbine engine 20, which can improve fuel efficiency. In some embodiments lattice bearing support 100 can be more axisymmetric than a known bearing support, which can allow smaller associated components (e.g., bosses that service tubes connect to), further contributing to a reduction in the mass of gas turbine engine 20. In other embodiments, lattice bearing support 100 can eliminate the need for other components. In an exemplary embodiment, lattice bearing support 100 can eliminate or reduce the need for a squirrel cage support and/or a squeeze film damper (not shown) associated with bearing assembly 38.

Referring to FIG. 5C, strut 150 is round in cross section (i.e., axial cross-section), having diameter D. In various embodiments, diameter D can vary from about 1-10 mm. In some embodiments, diameter D can be less than 1 mm or greater than 10 mm. Several factors can be used in establishing diameter D for a particular embodiment, with non-limiting examples including the physical size of lattice bearing support 100, the desired stiffness of lattice bearing support 100, the number of axial courses of struts 150, and the total number of struts 150 in lattice bearing support 100. Diameter D and the total number of struts 150 can also affect the cross-sectional area for axial fluid flow through lattice bearing support 100. For example, in some embodiments, scavenging oil flows axially through lattice bearing support 100. In some of these embodiments, it can be desirable to maximize the cross-sectional area for axial fluid flow, thereby allowing a greater flow (i.e., less resistance to flow). Diameter D and the total number of struts 150 can also affect the mass of lattice bearing support 100, with a lower mass resulting from a smaller diameter D and/or a lower number of struts 150. In some embodiments, it can be desirable to reduce the mass of lattice bearing support 100 (i.e., thereby reducing the overall mass of gas turbine engine 20).

Figure 5D:
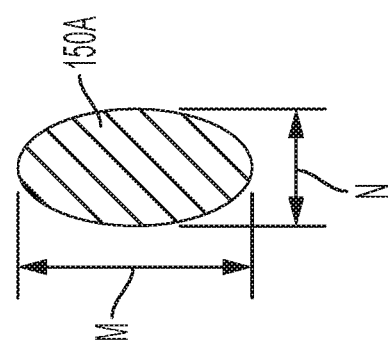
FIG. 5D is a cross-sectional view of a second embodiment of a strut shown in FIG. 5B.
Figure 5B:
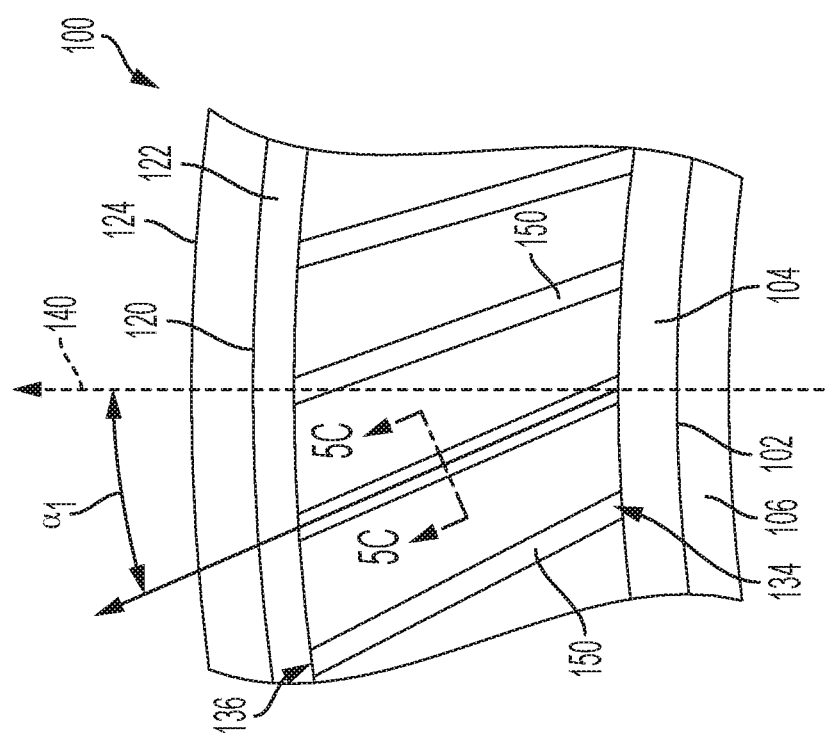
FIG. 5B is an enlarged view of the lattice bearing support shown in FIG. 5A.

FIG. 5D is a cross-sectional view of a second embodiment of strut 150 shown in FIG. 5B. Shown in FIG. 5D is strut 150A having major axis length M and minor axis length N. In the illustrated embodiment, strut 150A has an elliptical cross-sectional shape, and the ratio of major axis length M to minor axis length N is about 2. An advantage of strut 150A can be to increase the cross-sectional area for axial fluid flow through strut 150A by orienting major axis M axially (i.e., parallel to center axis CA as shown in FIG. 5A). In some embodiments, strut 150A can have a cross-sectional shape that is oval or oblong. In these or other embodiments, the ratio of major axis length M to minor axis length N can be less than about 2. In some of these embodiments, the ratio of major axis length M to minor axis length N can be as low as 1.0 (i.e., circular). In other embodiments, the ratio of major axis length M to minor axis length N can be greater than 2. In some of these other embodiments, the ratio of major axis length M to minor axis length N can be range from about 1-5. In some embodiments, the ratio of major axis length M to minor axis length N can be greater than 5. All ratios of major axis length M to minor axis length N are within the scope of the present disclosure.

Figure 6A:
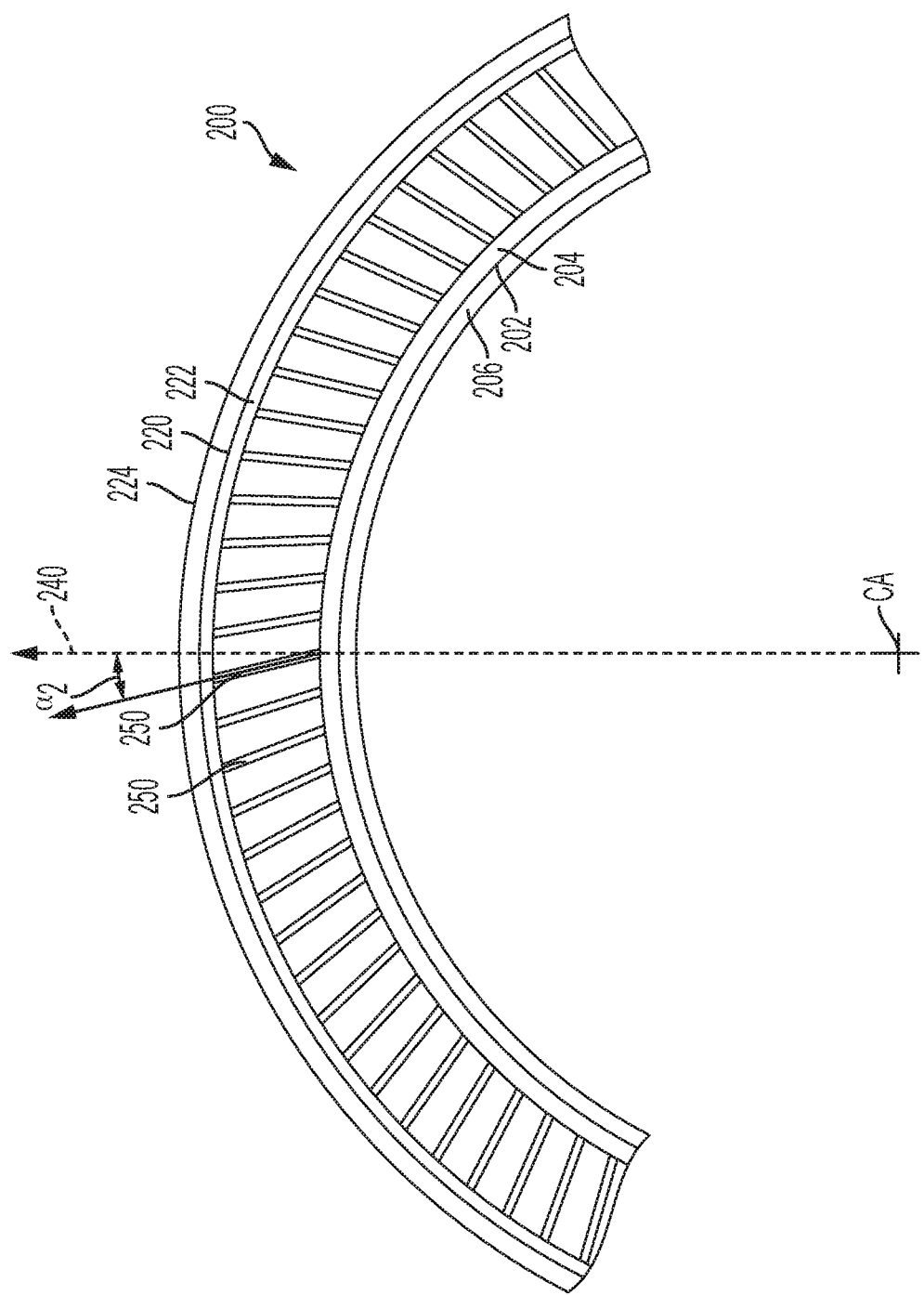
FIG. 6A is a partial axial view of a second embodiment of the lattice bearing support shown in FIG. 4.

FIG. 6A is a partial axial view of a second embodiment of lattice bearing support 100 shown in FIG. 4. FIG. 6B is an enlarged view of lattice bearing support 200 shown in FIG. 6A. FIG. 6C is a cross-sectional view of strut 250 shown in FIG. 6B taken along cut-line 6C-6C. FIGS. 6A-6C will be described concurrently. Shown in FIGS. 6A-6B are lattice bearing support 200, inner radial surface 202, inner structure 204, inner rim 206, outer radial surface 220, outer structure 222, outer radial flange 224, inner end 234, outer end 236, radial vector 240, and struts 250, each having a description substantially similar to that provided above in regard to FIGS. 5A-5C. Center axis CA is labeled in FIG. 6A (i.e., an axial view), and of strut angle $\alpha_2$ is labeled in FIGS. 6A-6B. Inner end 234 and outer end 236 applies to any particular strut 250 to identify the opposite (i.e., distal) ends with respect to center axis CA. Diameter D1 of strut 250 is labeled in FIG. 6C. In the illustrated embodiment, strut angle $\alpha_2$ is about 18 degrees. As described above in regard to FIGS. 5A-5B (i.e., showing strut angle $\alpha_1$ of 25 degrees), the smaller strut angle $\alpha_1$ (i.e., about 18 degrees) can provide a greater radial stiffness of lattice bearing support 200 with other parameters remaining about the same (e.g., the number of axial courses of struts 250, total number of struts 250 in lattice bearing support 200, diameter D1, material of construction). In the illustrated embodiment shown in FIG. 6C, diameter D1 is uniform along strut 250 from inner end 234 to outer end 236.

FIG. 6D is a cross-sectional view of a second embodiment of strut 250 shown in FIG. 6B. Shown in FIG. 6D are strut 250A, inner end 234A, outer end 236A, diameter D2 (i.e., measured at inner end 234A), and diameter D3 (i.e., measured at outer end 236A). In the illustrated embodiment, diameter D2 of strut 250A is greatest at inner end 234A and decreases moving toward outer end 236A where diameter D3 is the smallest. Accordingly, strut 250A can be referred to as a tapered strut with cross-sectional area being greatest (i.e., largest) at inner end 234A and least (i.e., smallest) at outer end 236A.

In the exemplary embodiment shown in FIGS. 6A-6C, strut 250A has a circular cross-sectional shape (e.g., as shown above in FIG. 5C). In some embodiments, strut 250 can have a cross-sectional shape that is non-circular. An exemplary non-circular shape is elliptical (e.g., as shown above in FIG. 5D). Therefore, an elliptical strut 250 can have major and/or minor axes (not labeled in FIG. 6D) that are greatest at inner end 234A and decreases moving toward outer end 236A. Accordingly, tapered strut 250 shown in FIG. 6D can apply to any cross-sectional shape where the cross-sectional area is greatest at inner end 234A and smallest at 236A.

FIG. 6E is a cross-sectional view of a third embodiment of strut 250 shown in FIG. 6B. Shown in FIG. 6E are strut 250B, inner end 234B, outer end 236B, diameter D4 (i.e., measured at inner end 234B), diameter D5 (i.e., measured at a point between inner end 234B and outer end 236B), and diameter D6 (i.e., measured at outer end 236B). Diameter D5 of strut 250A is smallest at a point between inner end 234B and outer end 236B and is greatest at either inner end 234B (i.e., diameter D4) or outer end 236B (i.e., diameter D6), or both. Diameter D5 of strut 250A is smallest at an intermediate point (not labeled) between inner end 234B and outer end 236B. Accordingly, strut 250B can be described as having a concave lengthwise cross-section. The intermediate point can also be referred to as an in-between point (i.e., being somewhere between inner end 234B and outer end 236B). In the illustrated embodiment, diameter D5 is at about a midpoint between inner end 234B and outer end 236B. Accordingly, in the illustrated embodiment, the intermediate point can be called a midpoint. In some embodiments, the location of diameter D5 can be closer to inner end 234B than to outer end 236B. In other embodiments, the location of diameter D5 can be closer to outer end 236B than to inner end 234B. In any of the foregoing embodiments, diameter D4 (i.e., measured at inner end 234B) can be either greater than or less than diameter D6 (i.e., measured at outer end 236B). In an exemplary embodiment, diameter D4 (i.e., at inner end 234B) is the greatest, diameter D5 (i.e., at a point between inner end 234B and outer end 236B) is the least, and diameter D6 (i.e., at outer end 236B) is between diameter D4 and diameter D5.

Referring again to FIG. 6E, strut 250B has a circular cross-sectional shape (e.g., as shown above in FIG. 5C) at diameters D4, D5, D6. In some embodiments, strut 250B can have a cross-sectional shape that is non-circular (e.g., as described above in regard to FIG. 6D), with an exemplary cross-sectional shape being elliptical (e.g., as shown and described above in regard to FIG. 5D). Accordingly, a non-circular strut 250B can be described as having a cross-sectional area that is smallest at a point between inner end 234B and outer end 236B.

Figure 7:
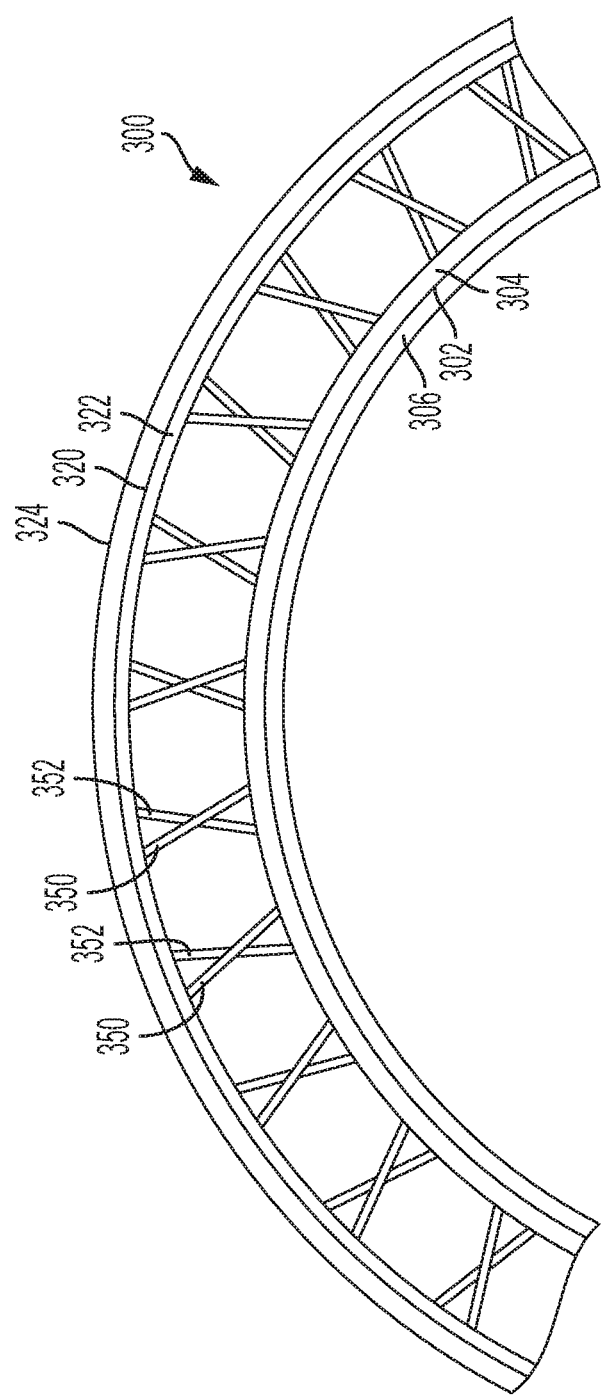
FIG. 7 is a partial axial view of a third embodiment of the lattice bearing support shown in FIG. 4.

FIG. 7 is a partial axial view of a third embodiment of lattice bearing support 100 shown in FIG. 4. Shown in FIG. 7 are lattice bearing support 300, inner radial surface 302, inner structure 304, inner rim 306, outer radial surface 320, outer structure 322, and outer radial flange 324, all having a description that is substantially similar to those provided above in regard to FIGS. 3A-3B and 4. Also shown in FIG. 7 are struts 350 which lean to the left (i.e., in an anti-clockwise direction), and struts 352 which lean to the right (i.e., in a clockwise direction), both having a description that is substantially similar to that provided above in regard to FIGS. 5A-5C. Accordingly, lattice bearing support 300 can be described as having struts that cross in opposing directions. Struts 350, 352 can have an associated strut angle (not labeled in FIG. 7) in a manner similar to that described above in regard to FIGS. 5A-5C. In the illustrated embodiment, struts 350 have a strut angle that is about the same as that of struts 352. In some embodiments, struts 350 can have a strut angle that is different from that of struts 352.

Struts 350 and struts 352 can each have an associated number of axial courses (not shown in FIG. 7). In an exemplary embodiment of lattice bearing support 300 having four axial courses of struts, there can be two axial courses of struts 350 (i.e., those leaning to the left in an anti-clockwise direction) and two axial courses of struts 352 (i.e., those leaning to the right in a clockwise direction). In some embodiments, the number of axial courses of struts 350 can be different from the number of axial courses of struts 352. In a particular embodiment, an advantage of lattice bearing support 300 having struts that cross in opposing directions can be to provide a greater stiffness than lattice bearing support 100 with other parameters remaining about the same (e.g., the total number of axial courses of struts 350, 352, the total number of struts 350, 352 in lattice bearing support 300, strut diameter, material of construction). [Note: please edit/add any additional description for this.]

Referring again to FIG. 7, all configurations and cross-sectional shapes of struts 350, 352 are within the scope of the present disclosure. Non-limiting examples of cross-sectional shapes include elliptical (e.g., as shown in FIG. 5D), tapered (e.g., as shown in FIG. 6D), and concave lengthwise (e.g., as shown in FIG. 6E.)

Struts 50, etc. shown and described above in regard to FIGS. 3A-3B, 5A-5D, 6A-6E, and 7 provide non-limiting exemplary embodiments of variations that can be used in a particular application to achieve one or more desired design parameters for lattice bearing support 100, etc., with other variations being within the scope of the present disclosure. In an exemplary embodiment, the cross-sectional shape and/or cross-sectional area of one or more struts 50 can vary in a continuous or non-uniform manner. In another exemplary embodiment, different struts 50 can have different values of strut angle $\alpha_1$. In yet another exemplary embodiment, one or more struts 50 can have a value of strut angle $\alpha_1$ that varies from inner end 134, etc. to outer end 136, etc. Accordingly, one or more struts 50 can be curved in a particular embodiment. In another exemplary embodiment, any of the foregoing features can vary in periodic circumferential pattern around lattice bearing support 100.

Discussion of Possible Embodiments

The following are non-exclusive descriptions of possible embodiments of the present invention.

A lattice bearing support comprising a circular inner structure having a center axis, the circular inner structure defining an inner radial surface; an inner rim disposed on the circular inner structure and projecting axially inward toward the center axis; a circular outer structure, disposed radially outward from the circular inner structure with respect to the center axis, the circular outer structure defining an outer radial surface; an outer radial flange disposed on the circular outer structure and projecting radially outward from the outer radial surface; and a plurality of struts disposed radially between the circular inner structure and the circular outer structure.

The lattice bearing support of the preceding paragraph can optionally include, additionally and/or alternatively, any one or more of the following features, configurations and/or additional components:

A further embodiment of the foregoing lattice bearing support, wherein: inner radial surface is configured to contactingly engage an outer race of a bearing assembly; and the inner rim defines an axial face that is configured to contactingly engage with the outer race, thereby at least partially axially supporting the lattice bearing support.

A further embodiment of the foregoing lattice bearing support, wherein: the outer radial flange defines a flange forward face and a flange aft face; the flange forward face is configured to contactingly engage with a forward structure, thereby at least partially axially supporting the lattice bearing support; and the flange aft face is configured to contactingly engage with an aft structure, thereby at least partially axially supporting the lattice bearing support.

A further embodiment of the foregoing lattice bearing support, wherein: each of the plurality of struts defines a strut angle relative to a radial vector projecting radially outward from the center axis; and the strut angle of each of the plurality of struts ranges from 0-60 degrees.

A further embodiment of the foregoing lattice bearing support, wherein the strut angle of each of the plurality of struts ranges from 10-45 degrees.

A further embodiment of the foregoing lattice bearing support, wherein: each of the plurality of struts has an axial cross-sectional shape that is circular; the axial cross-sectional shape defines a diameter; and the diameter ranges from 1-10 mm.

A further embodiment of the foregoing lattice bearing support, wherein: each of the plurality of struts defines an inner end near the circular inner structure and an outer end near the circular outer structure; and a cross-sectional area of one or more struts increases from the inner end to the outer end.

A further embodiment of the foregoing lattice bearing support, wherein: each of the plurality of struts defines: an inner end near the circular inner structure; an outer end near the circular outer structure; and an intermediate point located between the inner end and the outer end; and a cross-sectional area of one or more struts at the intermediate point is less than the cross-sectional area at either the inner end or the outer end.

A further embodiment of the foregoing lattice bearing support, wherein: one or more of the plurality of struts has an axial cross-sectional shape that is elliptical, oval, or oblong; the axial cross-sectional shape defines a major axis and a minor axis; and a ratio of a length of the major axis to a length of the minor axis ranges between 1-5.

A further embodiment of the foregoing lattice bearing support, wherein the major axis is parallel to the center axis, thereby reducing a restriction to flow of a fluid through the lattice bearing support.

A further embodiment of the foregoing lattice bearing support, wherein: the plurality of struts are arranged in axial courses; and the number of axial courses ranges from 1-12.

A further embodiment of the foregoing lattice bearing support, wherein: at least some of the plurality of struts lean in a first direction relative to a radial vector projecting radially outward from the center axis; at least some of the plurality of struts lean in a second direction relative to a radial vector projecting radially outward from the center axis; and the first direction is opposite the second direction.

A further embodiment of the foregoing lattice bearing support, comprising nickel, aluminum, titanium, copper, iron, cobalt, and/or alloys thereof.

A further embodiment of the foregoing lattice bearing support, wherein the lattice bearing support is manufactured by one or more of additive manufacturing, hybrid additive manufacturing, hybrid additive subtractive manufacturing, subtractive manufacturing, forging, extrusion, and/or casting processes.

A further embodiment of the foregoing lattice bearing support, wherein one or more characteristics of the plurality of struts is configured to provide a desired radial and/or axial stiffness.

A further embodiment of the foregoing lattice bearing support, wherein the one or more characteristics is selected from the list consisting of length, girth, shape, orientation, number, and material of composition.

A further embodiment of the foregoing lattice bearing support, wherein a gas turbine engine comprises one or more lattice bearing supports.

A lattice bearing support, comprising: a circular inner structure having a center axis, the circular inner structure defining an inner radial surface that is configured to contactingly engage an outer race of a bearing assembly; an inner rim disposed on the circular inner structure and projecting axially inward toward the center axis, the inner rim defining an axial face configured to contactingly engage with the outer race, thereby at least partially axially supporting the lattice bearing support; a circular outer structure, disposed radially outward from the circular inner structure with respect to the center axis, the circular outer structure defining an outer radial surface; an outer radial flange disposed on the circular outer structure and projecting radially outward from the outer radial surface, the outer radial flange defining a flange forward face and a flange aft face; and a plurality of struts disposed radially between the circular inner structure and the circular outer structure, thereby holding the circular outer structure relative to the circular inner structure.

The lattice bearing support of the preceding paragraph can optionally include, additionally and/or alternatively, any one or more of the following features, configurations and/or additional components:

A further embodiment of the foregoing lattice bearing support, wherein: each of the plurality of struts defines a strut angle relative to a radial vector projecting radially outward from the center axis; the strut angle of each of the plurality of struts ranges from 0-60 degrees; the plurality of struts are arranged in axial courses; and the number of axial courses ranges from 1-12.

A further embodiment of the foregoing lattice bearing support, wherein: the lattice bearing support comprises nickel, aluminum, titanium, copper, iron, cobalt, and/or alloys thereof; the lattice bearing support is manufactured by one or more of additive manufacturing, hybrid additive manufacturing, hybrid additive subtractive manufacturing, subtractive manufacturing, forging, extrusion, and/or casting processes; one or more characteristics of the plurality of struts is configured to provide a desired radial and/or axial stiffness; and the one or more characteristics is selected from the list consisting of length, girth, shape, orientation, number, and material of composition.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A lattice bearing support comprising:
   a circular inner structure having a center axis, the circular inner structure defining an inner radial surface;
   an inner rim disposed on the circular inner structure and projecting axially inward toward the center axis;
   a circular outer structure, disposed radially outward from the circular inner structure with respect to the center axis, the circular outer structure defining an outer radial surface;
   an outer radial flange disposed on the circular outer structure and projecting radially outward from the outer radial surface; and
   a plurality of struts disposed radially between the circular inner structure and the circular outer structure; wherein:
   the plurality of struts are arranged in axial courses;
   the number of axial courses ranges from 4-12;
   at least some of the plurality of struts lean in a first direction relative to a radial vector projecting radially outward from the center axis;
   at least some of the plurality of struts lean in a second direction relative to a radial vector projecting radially outward from the center axis; and
   the first direction is opposite the second direction.

2. The lattice bearing support of claim 1, wherein:
   the inner radial surface is configured to contactingly engage an outer race of a bearing assembly; and
   the inner rim defines an axial face that is configured to contactingly engage with the outer race, thereby at least partially axially supporting the lattice bearing support.

3. The lattice bearing support of claim 1, wherein:
   the outer radial flange defines a flange forward face and a flange aft face;
   the flange forward face is configured to contactingly engage with a forward structure, thereby at least partially axially supporting the lattice bearing support; and
   the flange aft face is configured to contactingly engage with an aft structure, thereby at least partially axially supporting the lattice bearing support.

4. The lattice bearing support of claim 1, wherein:
   each of the plurality of struts defines a strut angle relative to a radial vector projecting radially outward from the center axis; and
   the strut angle of each of the plurality of struts ranges from 0-60 degrees.

5. The lattice bearing support of claim 4, wherein the strut angle of each of the plurality of struts ranges from 10-45 degrees.

6. The lattice bearing support of claim 1, wherein:
each of the plurality of struts has an axial cross-sectional shape that is circular;
the axial cross-sectional shape defines a diameter; and
the diameter ranges from 1-10 mm.

7. The lattice bearing support of claim 1, wherein:
each of the plurality of struts defines an inner end near the circular inner structure and an outer end near the circular outer structure; and
a cross-sectional area of one or more struts decreases from the inner end to the outer end.

8. The lattice bearing support of claim 1, wherein:
each of the plurality of struts defines:
an inner end near the circular inner structure;
an outer end near the circular outer structure; and
an intermediate point located between the inner end and the outer end; and
a cross-sectional area of one or more struts at the intermediate point is less than the cross-sectional area at either the inner end or the outer end.

9. The lattice bearing support of claim 1, wherein:
one or more of the plurality of struts has an axial cross-sectional shape that is elliptical, oval, or oblong;
the axial cross-sectional shape defines a major axis and a minor axis; and
a ratio of a length of the major axis to a length of the minor axis ranges between 1-5.

10. The lattice bearing support of claim 9, wherein the major axis is parallel to the center axis, thereby reducing a restriction to flow of a fluid through the lattice bearing support.

11. The lattice bearing support of claim 1, comprising nickel, aluminum, titanium, copper, iron, cobalt, and/or alloys thereof.

12. The lattice bearing support of claim 1, wherein the lattice bearing support is manufactured by one or more of additive manufacturing, hybrid additive manufacturing, hybrid additive subtractive manufacturing, subtractive manufacturing, forging, extrusion, and/or casting processes.

13. The lattice bearing support of claim 12, wherein one or more characteristics of the plurality of struts is configured to provide a desired radial and/or axial stiffness.

14. The lattice bearing support of claim 13, wherein the one or more characteristics is selected from the list consisting of length, girth, shape, orientation, number, and material of composition.

15. A gas turbine engine comprising one or more lattice bearing supports of claim 1.

16. A lattice bearing support comprising:
a circular inner structure having a center axis, the circular inner structure defining an inner radial surface that is configured to contactingly engage an outer race of a bearing assembly;
an inner rim disposed on the circular inner structure and projecting axially inward toward the center axis, the inner rim defining an axial face configured to contactingly engage with the outer race, thereby at least partially axially supporting the lattice bearing support;
a circular outer structure, disposed radially outward from the circular inner structure with respect to the center axis, the circular outer structure defining an outer radial surface;
an outer radial flange disposed on the circular outer structure and projecting radially outward from the outer radial surface, the outer radial flange defining a flange forward face and a flange aft face; and
a plurality of struts disposed radially between the circular inner structure and the circular outer structure, thereby holding the circular outer structure relative to the circular inner structure; wherein:
the plurality of struts are arranged in axial courses;
the number of axial courses ranges from 4-12;
at least some of the plurality of struts lean in a first direction relative to a radial vector projecting radially outward from the center axis;
at least some of the plurality of struts lean in a second direction relative to a radial vector projecting radially outward from the center axis; and
the first direction is opposite the second direction.

17. The lattice bearing support of claim 16, wherein:
each of the plurality of struts defines a strut angle relative to a radial vector projecting radially outward from the center axis; and
the strut angle of each of the plurality of struts ranges from 0-60 degrees.

18. The lattice bearing support of claim 16, wherein:
the lattice bearing support comprises nickel, aluminum, titanium, copper, iron, cobalt, and/or alloys thereof;
the lattice bearing support is manufactured by one or more of additive manufacturing, hybrid additive manufacturing, hybrid additive subtractive manufacturing, subtractive manufacturing, forging, extrusion, and/or casting processes;
one or more characteristics of the plurality of struts is configured to provide a desired radial and/or axial stiffness; and
the one or more characteristics is selected from the list consisting of length, girth, shape, orientation, number, and material of composition.

* * * * *